United States Patent [19]

Wydler

[11] Patent Number: 4,691,112

[45] Date of Patent: Sep. 1, 1987

[54] APPARATUS FOR THE DETECTION OF OPTICAL MARKS ON A FILM SUPPORT MOVED RELATIVE TO THE APPARATUS

[75] Inventor: Peter Wydler, Zürich, Switzerland

[73] Assignee: Alos AG, Zürich, Switzerland

[21] Appl. No.: 750,133

[22] Filed: Jul. 1, 1985

[30] Foreign Application Priority Data

Jul. 20, 1984 [CH] Switzerland .................. 3548/84

[51] Int. Cl.$^4$ ........................................... G06K 7/14
[52] U.S. Cl. .................................. 250/570; 353/26 A
[58] Field of Search ............. 250/570, 557, 561, 571; 353/26 A, 27 A; 355/41; 377/17–19, 53

[56] References Cited

U.S. PATENT DOCUMENTS

| | | | |
|---|---|---|---|
| 3,778,630 | 12/1973 | White et al. | 250/557 |
| 3,885,866 | 5/1975 | Stearns | 353/26 A |
| 3,941,981 | 3/1976 | Abe et al. | 377/18 |
| 3,999,846 | 12/1976 | Sone et al. | 377/18 |
| 4,207,473 | 6/1980 | Nakatani et al. | 353/26 A |
| 4,219,737 | 8/1980 | Gagnon et al. | 353/26 A |
| 4,457,008 | 6/1984 | Nakatani et al. | 250/570 |

FOREIGN PATENT DOCUMENTS 56-63243  5/1981  Japan.

*Primary Examiner*—Edward P. Westin
*Attorney, Agent, or Firm*—Walter C. Farley

[57] ABSTRACT

An apparatus for detecting optical marks on a film support moved relative to the apparatus includes a light source and light detector for detecting optical marks on the film support, the light detector having at least one photoresponsive sensor arranged in fixed manner over the film track, the sensor having a number of photoresponsive elements arranged at right angles with respect to the direction of motion of the film track and which, without intermediate optics, are in the immediate vicinity of the film support. Part of the photoresponsive elements can be used for scanning the image marks or blips and another part for scanning the document parts or other black/white values in the document area of the film.

2 Claims, 8 Drawing Figures

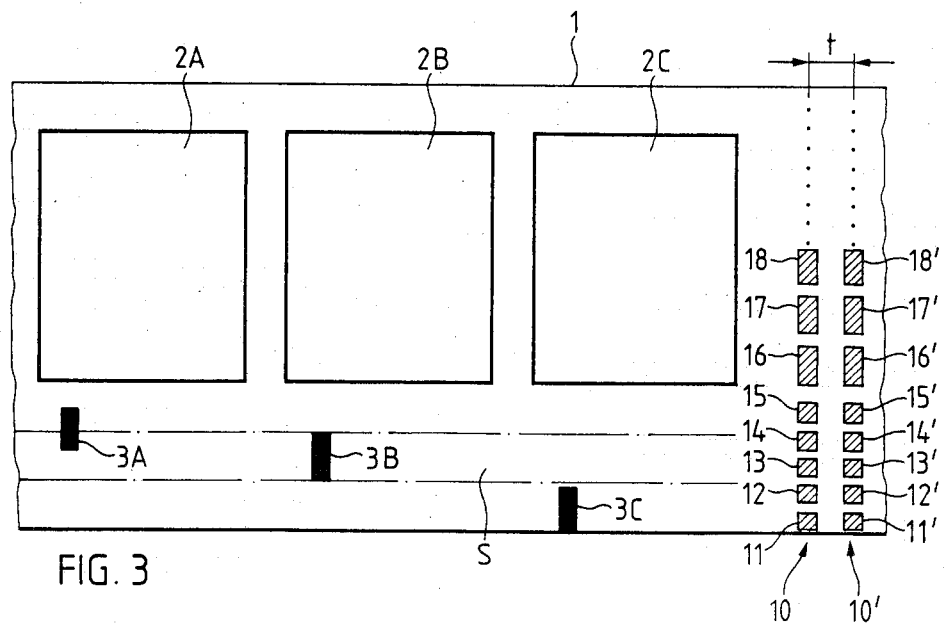
FIG. 3
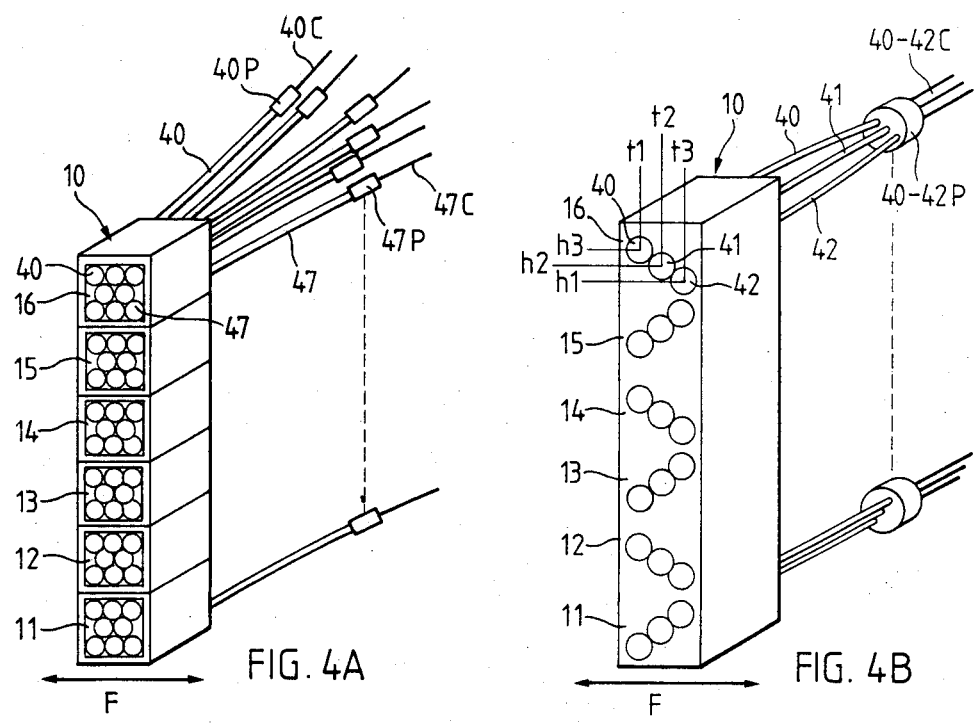
FIG. 4A
FIG. 4B

APPARATUS FOR THE DETECTION OF OPTICAL MARKS ON A FILM SUPPORT MOVED RELATIVE TO THE APPARATUS

BACKGROUND OF THE INVENTION

The invention relates to the field of documentation technology, particularly microfilm technology, and deals with an apparatus for the detection of optical marks on a film support which is moved relative to the detection apparatus.

In order to avoid space-intensive filing, the microfilming of documents has become widely used. Microfilmed documents take up little space, but on the other hand it is not possible to directly examine them. Two different functions are required to make them "recognizable", firstly, the recovery of a sought document from the compressed information space and, secondly, the conversion of the miniaturized optical image to physiologically correct dimensions for the human eye. In the prior art an attempt has always been made to simultaneously perform both functions with a single apparatus.

For recovery purposes, the individual information units (e.g. documents) are marked with optical marks which, when adequately detected, should lead to the sought document. The refound document is then generally projected in a manner suitable for reading and can be optionally directly reenlarged on paper. The invention deals with the first part of the problem, namely the seeking of the desired document, particularly on roll films, in which the information is filed sequentially or blockwise sequentially.

The optical marks on roll films, called image marks or blips, generally lead to the desired information by counting. In order to count the blips, they must be previously scanned and detected. It is here that an apparatus problem occurs. Blips are now conventionally detected by means of optical semiconductor sensors, e.g., by a phototransistor or a photodiode, which is either located in the direct vicinity of the film or, by means of an optical glass fiber, is coupled into the transmitted light path to measure the locally variable densities of the film. The sensor must coincide with the geometrical locus of the blip perpendicular to the direction of movement and therefore, due to the different positioning of the blips on the film, due to fluctuations in the image mark arrangement within the film or due to divergences in the image mark arrangements between individual films, etc. must be mechanically adjustable. By means of such a mechanical adjusting device, the sensor is adjusted to the blips which, as stated, apart from possible different positions on the film can also have different sizes, with possibly different information contents, in order to ensure a completely faultless scanning. However, it not infrequently occurs that during operation readjustment is necessary or the blip track is varied from roll to roll, which also requires an adjustment.

Thus, DE-OS No. 2256304 discloses a search reader with such a displaceable mounting support of the photoelectric cell, i.e. the photoactivatable element, in which readjustment is possible when required. However, this is contrary to the complete automation of a planned information search. The monitoring of the photoelectric cell function by humans is still necessary, apart from the monitoring of the documentation search, in the way in which it has always been necessary in a time-consuming manner, although human intelligence should only really be used for the evaluation of the document.

SUMMARY OF THE INVENTION

An object of the present invention is to provide an apparatus permitting a fully automatic retrieval of information from film supports having optical marks of any type and without any mechanical adjustment. Preferably the apparatus is to be used in connection with roll films, but must also be able to process automatically supplied microfiche.

This object is achieved in an apparatus wherein a light detector formed from at least one photoactivatable sensor is arranged in fixed manner over the film track having a plurality of photoresponsive elements distributed at right angles over the film tack which, without intermediate optics, are positioned in the immediate vicinity of the film support moved past the photoactivatable sensor.

DESCRIPTION OF THE DRAWINGS

The invention is described in greater detail hereinafter relative to non-limitative embodiments and with reference to the attached drawings, wherein:

FIG. 3 is a further embodiment of a double, but still locally fixed sensor array for the additional detection of the dynamic behavior of the film to be scanned;

FIG. 4A is a perspective view of a light guide arrangement coupled to photoactivatable components;

FIG. 4B is a perspective view of another arrangement of light guides as photooptical basic elements;

DETAILED DESCRIPTION OF THE PREFERRED EMBODIMENTS

Figure 1:
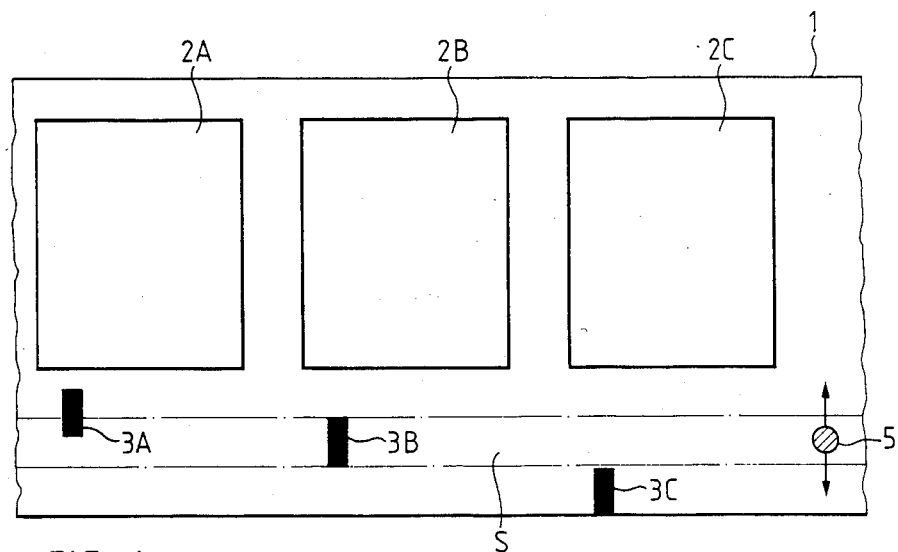
FIG. 1 is a basic representation of a film track with a mechanically displaceable sensor according to the prior art.

FIG. 1 shows a detail from a microfilm 1 with three information blocks 2A, 2B and 2C, which can be pictures, documents, etc. An optical mark or blip 3A, 3B or 3C is associated with each of these information blocks. As is standard practice, these blips are arranged below the document as seen from the viewing image side. However, this is not prescribed and is merely a convention. Blip 3B is located on a marking track or blip channel S, over which is also centrally arranged a sensor 5 displaceable at right angles to the longitudinal dimension of the film or the movement path thereof. This mechanically realized displaceability is indicated by two oppositely directed arrows.

Blips 3A and 3C are shown alongside the marking tracks S, blip 3A being somewhat less displaced than blip 3C, which cannot even partly be detected by sensor 5. In order to be able to detect all the blips, sensor 5 must be moved at right angles to the film direction, either manually or electronically. This rather exaggerated example clearly shows the problem of local adjustment.

Figure 2:
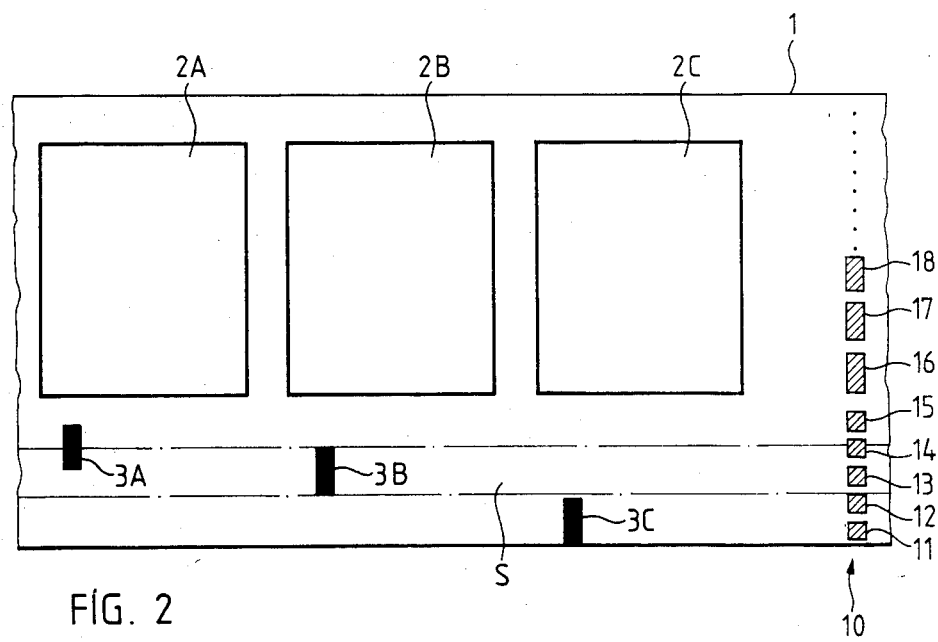
FIG. 2 is a first embodiment of the invention with a simple, locally fixed sensor array for the scanning of the complete film width.

FIG. 2 shows an embodiment of the invention enabling this problem to be eliminated. The same film as shown in FIG. 1, i.e. with the blips 3A and 3B diverging from the preferred position, is scanned with a locally fixed sensor 10. The latter comprises a nonadjustable lineally arranged array of photoresponsive devices or elements, such as diodes, extending over the entire width or of frontally scanning light wire bundles used as transmission means to conduct light to photodiodes or other photoresponsive components, such as CCD arrays and the like, coupled to the other side of the light conductors. The light transmitted through the film is scanned for optical density changes. The array comprises a plurality of e.g. squarely or rectangularly shaped optically active surfaces 11, 12 ... 18 ... n of random cross-section, strung together in a linear column without the use of auxiliary or intermediate optics and in the immediate vicinity of the film. The elimination of imaging optics between the mark to be scanned and the photoresponsive component inter alia removes the known problems connected with the focusing of the optics necessary for a good resolution. A logic circuit, not shown, evaluates the blip-activated or non-activated sensor surfaces 11-15 and, as is readily apparent, also covers markings outside the marking track S or the actual blip channel. As with the prior art sensor 5 according to FIG. 1, with the sensor 10 according to the invention blips of varying lengths can be evaluated by travel-time measurement. However, the invention also permits several tracks, which can be arranged in hierarchic manner to be simultaneously scanned, so that a decimal coding can be obtained. Thus, with relatively little electronic expenditure, decade counters can be connected in such a way that in the case of a high search speed only the most significant blips and at low search speed only the least significant blips are read.

Moreover, the array technology according to the invention also permits the scanning and evaluating of information other than blip-based information. The sensor elements 14 ... 18 ... n shown in FIG. 2 are located over the information or picture areas relating to the documents. It is merely a cost question as to how such a linear array is to be equipped with optically active recording zones or photoresponsive elements and which means are selected for the resolution and local scanning, e.g. for scanning a bara code.

The photoresponsive linear array according to the invention can also be adapted to the modified conditions in the case of a modification to the arrangement of the marks on the film or in the case of additionally applied information without great electrical hardware or mechanical expenditure. Adaptation takes place in an electronic or software manner, i.e. the gates associated with each photoresponsive element of the array are connected in an adequate software manner, i.e. in the case of a microprocessor evaluation, it is merely necessary to read in a program for the different film types and which supports the sensor 10, without any need to modify the hardware. Thus, the sensor can be designed for conventionally used 16 mm films or the 35 mm films used for the filming of drawings, with or without edge perforations. It is also possible to use the same sensor for different film widths up to fiches automatically moved under the sensor, while taking account of the particular circumstances by the software-controlled connection of the active elements. It is merely a question of the coding on the film support and the program for evaluating this coding.

FIG. 3 shows another construction of the invention, in which two spaced, juxtaposed linear arrays 10, 10' are in a position to detect the dynamic behavior of the film moved under the sensor. The travel-time behavior (transit time t) of the detected information can be used to provide details about the film speed and movement direction on the one hand, but also about time-dependent coding on the other. In this connection reference is made to the known nibble technology in connection with data floppy discs. On the basis of this technology, using a controlled apparatus for darkening the projection, it is possible to introduce a "read authorization" for certain documents or a "read suppression" for othr documents on the same film. The invention makes it possible to obtain the information on film supports by means of software processors. Geometrical divergences in the sense of errors can be mathematically counted in this way. Changes in the code type such as different documentation techniques can be rapidly stored and simply carried out in program routines with a flexibility such as was not hitherto possible with known mechanical means.

FIGS. 4A and 4B show the basic photoresponsive elements in two embodiments with light conductors, the film-facing surfaces of which are cut "optically smooth" in bundles and which conduct the film-modulated light from the transmitter to photoresponsive components. Following conversion, the electrical signals are supplied to an input circuit representing the read matrix. This circuit identifies the position of each of the individual fibers or each individual bundle of the sensor. The first embodiment according to FIG. 4A shows the optically active faces 11, 12, ... 16 each including an ordered bundle of seven light conductors 40 to 47. It is clear that neither the requirement of a possible order, nor the number of light conductors is prescribed and is dependent on the specific solution of which arrangement is of an optimum nature for information detection. Photoresponsive elements 40P are coupled to light guides 40–47 to make the converted signals available to the evaluation circuit by means of a line 40C. This is shown on the final fiber 47 of the bundle: light guide 47, photoresponsive element 47P and galvanic conductor 47C. In this example, sensor 10 has six optically active faces 11 to 16. The complete sensor is fitted in a fixed manner and need not be mechanically adjusted. The film F from which information is sought moves relative to the sensor and this is shown by a double arrow below the sensor.

Another embodiment of this type is shown in Fig. 4B, in which the light guides now have a clearly defined position. This represents the example of the diagonal arrangement of, in this case, three light guides 40, 41 and 42 which are able to resolve the optically active faces 11 to 16 in subchannels or tracks h1, h2, h3 and transit time points t1, t2, t3. In each case three light guides are guided to a photoresponsive element 40–42P, which can be read in a timed manner. Unlike in the case of the static matrix according to the embodiment of FIG. 4A, this is a dynamic matrix in which the third dimension is time. The evaluation of the signals obtained is brought about by a suitable evaluation circuit.

These two embodiments are merely intended to give an idea of the numerous different possibilities covered by the present invention. Details of the evaluation, processors and circuitry do not form the subject matter of the present invention.

Figure 5:
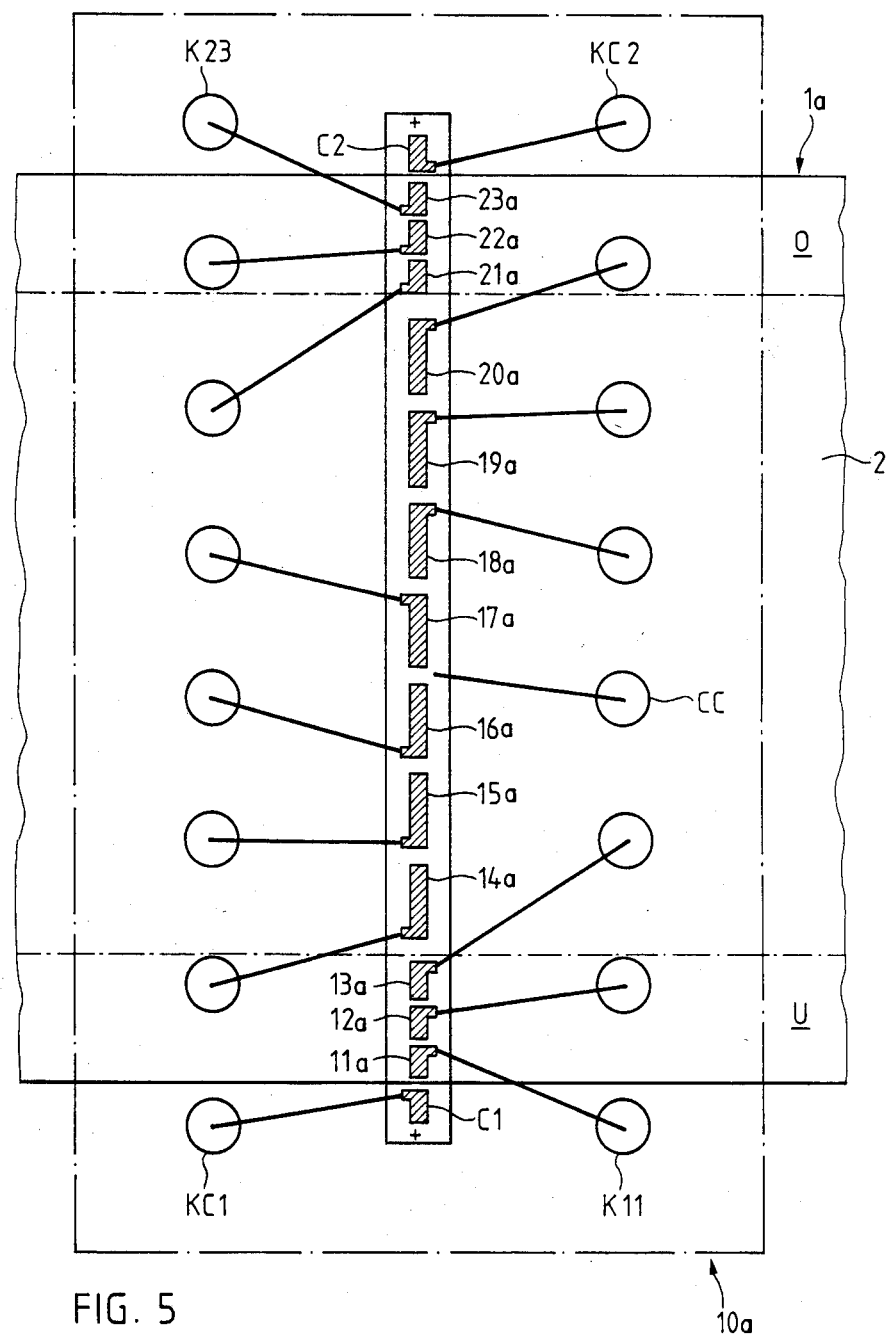
FIG. 5 is an enlarged view showing structural detail of the embodiment according to FIG. 2.

FIG. 5 shows the reading face of a sensor 10a with a 16 mm film 1 placed adjacent thereto to show the normal relative position, the film having one or both of the bottom U and top O blip channels and the document area 2. Sensor 10a comprises a linear arrangement of 15 silicon cells 11a–23a on a substrate of 1.2×18 mm, arranged for use with 16 mm film, the active faces of the cells in the blip channel each having an area of 0.3×0.6 mm, while those in the image area are 0.3×1.3 mm and the bonding zones on each cell are 0.15×0.15 mm. Each cell 11a to 23a, like the two cells C1 and C2 outside the film surface, is connected to a contact pad KC1, KC2, K11...K23, as well as to a common cathode CC. The connection between substrate/cells to the contact pads, which can be arranged on a printed circuit board, takes place by means of known bonding technology. The two photoresponsive cells located outside the film surface have process significance. They are clearly correlated with the transmitter via the light emanating from the latter, i.e. without a variable which would in this case be the film and are consequently used for reference measurement purposes, in that they permit the observation of aging processes of the transmitter and/or receiver. Each blip channel U, O is scanned with three cells and the document area with seven cells. For 16 mm films, as here, this represents a very high resolution. In addition, the complete film width is monitored and any arrangement of marks, windows, etc. can be detected on a 16 mm microfilm and evaluated. The sensor according to the invention provides a large amount of information, which was not available from the outset and it is merely dependent on the evaluating circuit and the associated software as to what can be carried out.

The present construction of the sensor with 15 active faces constitutes a monolithic photodiode array, of the type already used with other geometries of the faces for the most varied purposes in technology. Planar processes in modern semiconductor technology make it possible to obtain photodiodes with a high light sensitivity and homogeneous electrical characteristics is substantially any desired geometrical configuration.

Figure 6:
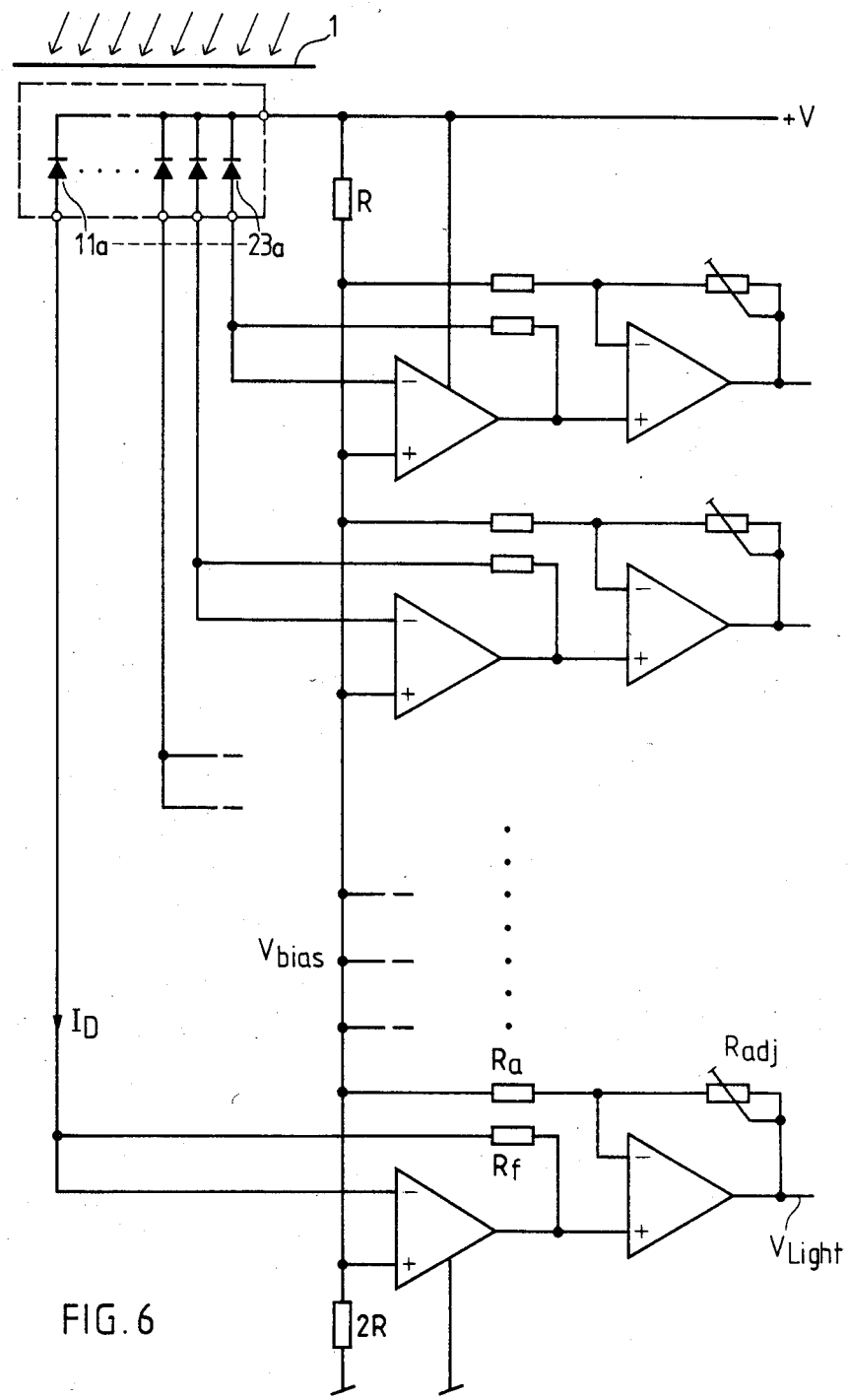
FIG. 6 is the circuit diagram of a signal conditioning circuit usable in a sensor array according to FIG. 2.

For reasons of completeness, FIG. 6 shows a circuit proposal for signal conditioning from the sensor. The light/voltage signals converted by the photoactive elements are made available in the represented circuit to the evaluation circuit in accordance with the following formula:

$$V_{(Light)} = V_{(bias)} - (I_D \times R_f \times ((R_a + R_{adj})/R_a))$$

Thus, it is a current-to-voltage converter with gain. The currents with impressed information obtained by the photoresponsive elements can naturally also be further processed in some other way.

Figure 7:
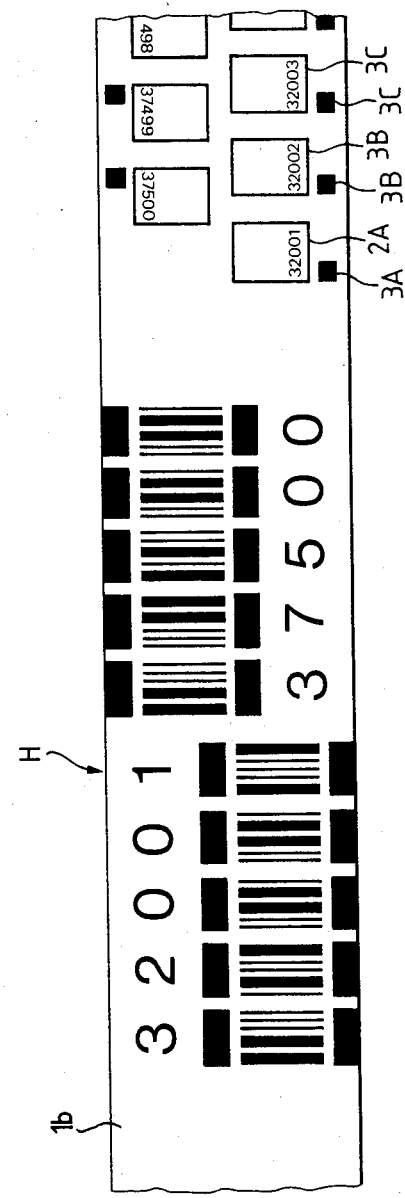
FIG. 7 is a specific example of application of the invention to a microfilm with an image mark or blip/bar code combination.

FIG. 7 finally shows one of the many different possibilities when using the apparatus according to the invention. On the represented duo-film there are two rows of pictures or documents with the associated blips on two blip channels. The first picture 2A with blip 3A carries in a continuous numbering system Number 32001 on the lower channel in the drawing, while the 1st picture in the upper channel carries the Number 37500. A lead H now carries a marking comprising a bar code which, for simplicty reasons only, here only shows the information of the number of the first and last picture areas. It is unimportant what information is impressed on a leader and/or trailer and the intention is to show that the sensor according to the invention is now in a position to optically "read" the leader with the bar coding, as well as the following film with picture areas and the blips on both channels. It is only dependent on the operational software as to how much of the read information is finally used.

Thus, the invention relates to an apparatus for the detection of optical marks on a film support moved relative to the apparatus characterized by at least one sensor 10 extending over at least part of the active film width substantially at right angles to the movement direction of the film 1 and positioned in the vicinity thereof, while having a plurality of photoresponsive basic elements 11...18...n and photoactivatable over at least part of its constructional length. Special embodiments can have two parallel, photoresponsive sensors 10, 10', located substantially at right angles to the movement direction of film 1, spaced in the movement direction by a distance t and positioned in the vicinity of the film, each sensor being provided with photoresponsive basic elements 11...18...n. Also, the photoresponsive sensor 10 or photoresponsive sensors 10, 10' can have a one-dimensional arrangement of photoresponsive basic elements 11...18...n extending over the length thereof corresponding to the active film width. Part of the photoresponsive elements 11...15 of sensor 10 or sensors 10, 10' can be designed for scanning blips 3A, 3B, 3C and another part of the photoresponsive element 16...n can be used for scanning document parts 2A, 2B, 2C or other black/white values in the document region of the film.

According to further embodiments, the photoresponsive basic elements 11...18...n comprise light conductors, whereof one frontal end is the reading side and the other frontal end is coupled to the photoresponsive elements, or the photoresponsive basic elements 11...18...n themselves comprise photoresponsive elements.

The photoresponsive elements 11...18...n of the sensor 10 or the sensors 10, 10' are preferably connected to a downstream electronic logic, which in program-defined manner selects the photoresponsive elements relevant for the detection of the optical marks or the black/white values in the document area of the film and connects those photoresponsive elements in or out of the information stream.

I claim:

1. A film reader for receiving longitudinally movable film having images thereon and having optically distinctive marks representative of locations of the images, the marks being in any of a plurality of possible lateral locations relative to the direction of motion of the film, the reader comprising detection means for sensing the presence of said marks, said detection means comprising an elongated substantially continuous array of a plurality of photoresponsive devices, said array having a total length at least as great as the lateral dimension of said film, each of said photoresponsive devices having an active light-receiving surface and all of said active surfaces of said devices facing in substantially the same direction in said array; and means for supporting said array in a fixed position so that said active surfaces are exposed to and directed to receive light from said film and so that the long dimension of said array extends substantially perpendicular to the desired direction of motion of said film, whereby said photoresponsive devices in said array are responsive to changes in the optical characteristics of said film including changes resulting from the presence of said marks to produce electrical signals representative of said changes without regard to uncontrolled lateral relocation of said film or said marks thereon.

2. A reader according to claim 1, wherein said apparatus further comprises a second elongated substantially continuous array of a plurality of photoresponsive devices, and means for supporting said second array in substantially parallel relationship with said first-mentioned array.

* * * * *